(12) United States Patent
Edlinger

(10) Patent No.: US 7,678,167 B2
(45) Date of Patent: Mar. 16, 2010

(54) DEVICE AND METHOD FOR OXIDIZING, REDUCING, CALCINING, SINTERING, OR MELTING DUSTS

(75) Inventor: Alfred Edlinger, Bartholomäberg (AT)

(73) Assignee: Patco Engineering GmbH, Zug (CH)

( * ) Notice: Subject to any disclaimer, the term of this patent is extended or adjusted under 35 U.S.C. 154(b) by 720 days.

(21) Appl. No.: 11/547,347

(22) PCT Filed: Apr. 1, 2005

(86) PCT No.: PCT/AT2005/000115

§ 371 (c)(1), (2), (4) Date: Sep. 29, 2006

(87) PCT Pub. No.: WO2005/094153

PCT Pub. Date: Oct. 13, 2005

(65) Prior Publication Data

US 2008/0271599 A1    Nov. 6, 2008

(30) Foreign Application Priority Data

Apr. 1, 2004    (AT) ............................... A 583/2004

(51) Int. Cl.
*B01D 45/12*    (2006.01)
(52) U.S. Cl. ................. 55/385.1; 55/459.1; 65/134.8; 209/715
(58) Field of Classification Search ............... 55/385.1, 55/459.1; 209/715; 431/173, 189; 65/134.8
See application file for complete search history.

(56) References Cited

U.S. PATENT DOCUMENTS 6,047,566 A * 4/2000 Fleckenstein et al. ...... 65/134.8

FOREIGN PATENT DOCUMENTS

| AT | 411 362 B | 12/2003 |
|---|---|---|
| EP | 0 484 302 A2 | 5/1992 |
| SU | 1605088 | 7/1990 |
| WO | WO 01/62987 A1 | 8/2001 |
| WO | WO 03/070651 A1 | 8/2003 |
| WO | WO 2004/081237 A1 | 9/2004 |

* cited by examiner

*Primary Examiner*—Robert A Hopkins
(74) *Attorney, Agent, or Firm*—Chapman and Cutler LLP

(57) ABSTRACT

In a device for oxidizing, reducing, calcining, sintering or melting dusts such as, e.g., furnace or steel dusts, marl and lime dust mixtures, shredder light fractions, mineral dusts such as, e.g., glass dusts, cement kiln bypass dusts, dry sewage sludge, paper slurries or oil-containing grinding dust suspensions, using a dosing cyclone into which the dusts are charged and to which a tangential connector for feeding carrier gases is connected, and a combustion chamber following the dosing cyclone in the axial direction, wherein fuel and optionally additional carrier gas are injected into the combustion chamber coaxially with the discharge opening of the cyclone, a lance is arranged in the interior of the dosing cyclone, coaxially with the discharge opening of the dosing cyclone, for the introduction of liquid substances, substances dissolved in liquids or suspended in gases, or gaseous oxidizable substances and, in particular, fuels. According to the proposed method, the dosing cyclone is operated at a pressure reduced relative to the pressure prevailing in the fuel lance.

20 Claims, 2 Drawing Sheets

Figure 1:
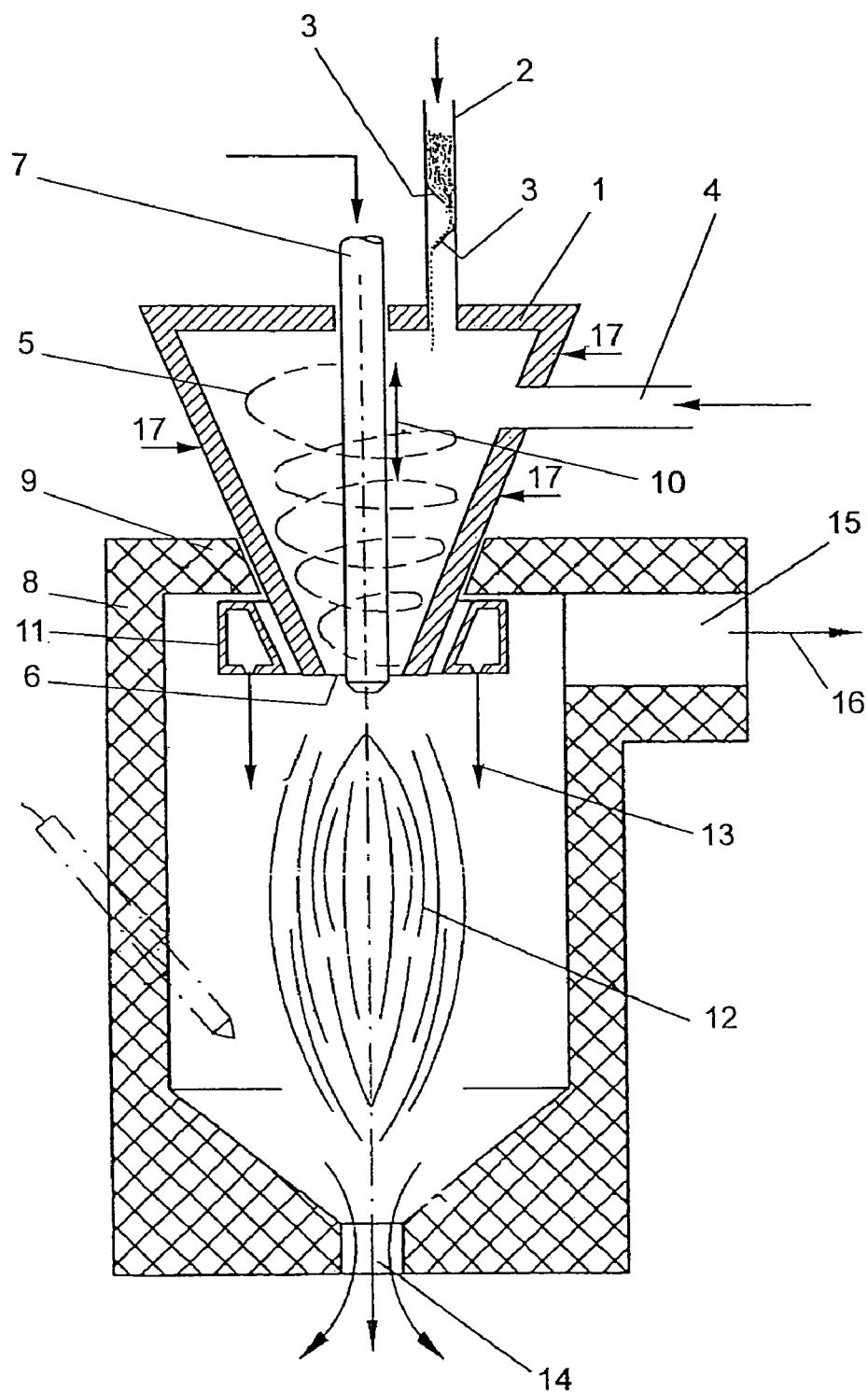

DEVICE AND METHOD FOR OXIDIZING, REDUCING, CALCINING, SINTERING, OR MELTING DUSTS

The invention relates to a device for oxidizing, reducing, calcining, sintering or melting dusts such as, e.g., furnace or steel dusts, marl and lime dust mixtures, shredder light fractions, mineral dusts such as, e.g., glass dusts, cement kiln bypass dusts, dry sewage sludge, paper slurries or oil-containing grinding dust suspensions, using a dosing cyclone into which the dusts are charged and to which a tangential connector for feeding carrier gases is connected, and a combustion chamber following the dosing cyclone in the axial direction, wherein fuel and optionally additional carrier gas are injected into the combustion chamber coaxially with the discharge opening of the cyclone, as well as a method for oxidizing, reducing, calcining, sintering or melting dusts using such a device.

It is known to use burners capable of being operated with different fuels to melt fine solids and optionally sludges. In those cases, the solids can be injected into the combustion chamber or a melting cyclone, to which end more or less expensive injectors are employed. Such injectors or systems that serve to inject solids into combustion chambers while using carrier gases, as a rule, call for complex nozzles which, in addition, usually have to be adjustable in order to adjust a suitable master batch. Known injectors are highly prone to wear, wherein, in particular when using extremely abrasive charging materials, even varying blending rates have been observed in known injectors at an increasing abrasion or wear, leading to irregular melting results. Moreover, injectors are usually operated in a pulsed manner, which may again lead to irregularities in the melting behavior.

WO 03/70651 has proposed a device of the initially defined kind, which excels by an extremely low wear even when using extremely abrasive raw materials, and by which also coarse charging material can be melted without difficulty. It has, in particular, become feasible by such a configuration to minimize refractory problems with the lining of the combustion chamber and to do with simple means that allow the melting procedure to largely proceed without any contact between the melts and the walls of the combustion chamber.

The mode of operation of the dosing cyclone in terms of action can be compared to that of an air chamber such that a continuous and pulsations-free input of dusts or fine solids into a consecutively arranged combustion chamber is ensured in a simple manner. The combustion chamber itself can be heated by the aid of burners to the temperatures required to melt the dusts, for instance temperatures of from 1200° C. to 1650° C., with fuel and optionally additional carrier gas being injected into the combustion chamber coaxially with the discharge opening of the cyclone in that known configuration. Such a coaxial supply of fuels enables the solids injected with a swirl to blend with the combustion gases in a first region, whereupon rapid melting of the fine-particle solids is enabled by a particularly rapid temperature transfer in the flame, with the circulating swirl flow being largely maintainable. This will lead to a relatively long contact time with the flame over a short axial length, since the solids particles, substantially in the burning cone along a helical line, will follow a path that is relatively long as compared to the axial length.

The invention aims to further develop a device of the initially defined kind with a view to substantially extending its field of application, whereby, in particular, a stable and adjustable flame as well as an improved flame picture are to be obtained while enhancing both the burnout and the respectively desired reaction with the reactants at high temperatures, by optimizing the shape of the flame. By optimizing the shape of the flame, an optimization of the respectively adjusted temperature is to be feasible at the same time in order to ensure that way sintering or melting in the gas phase. Departing from the initially defined, known device, the configuration according to the invention essentially consists in that a lance is arranged in the interior of the dosing cyclone, coaxially with the discharge opening of the dosing cyclone, for the introduction of liquid substances, substances dissolved in liquids or suspended in gases, or gaseous oxidizable substances and, in particular, fuels. Although the coaxial ejection of fuels has already been proposed in the known configuration, the configuration according to the invention is further developed to the extent that a lance is arranged in the interior of the dosing cyclone to enable the coaxial ejection of fuels and/or additional gases. Such a lance leads to the formation of an annular gap in the region of the discharge opening of the cyclone, which causes the material to be sintered, oxidized, reduced, calcined or melted to be ejected as a flame jacket. The rotational movement imparted on the material present in the dosing cyclone consequently results in a longer residence time in the region of the flame over an accordingly short axial length so as to enable the optimization of the desired reaction. At the same time, this configuration enables an accordingly low pressure to be adjusted within the combustion chamber in the region of the mouth of the dosing cyclone, said pressure decrease being proportional to the increase in the rotational speed. By the aid of the fuel and/or additional gases ejected through the lance, an appropriate suction pressure will be obtained in the mouth region, which counteracts a backfire of the burner into the cyclone and, in the main, allows for a substantially lower pressure level in the region of the cyclone. Due to the reduction of the pressure level in the dosing cyclone, expensive dosing means for the charging of the dust-like material to be reacted can be obviated and expensive cellular wheel sluices can be replaced with simple dosing shuttle valves, which offer the additional advantage that the dust-like material to be reacted being can also be charged as hot material.

To optimize the flame picture and the respectively desired reaction, the configuration advantageously is devised such that the lance is height-adjustable in the axial direction. By the lance being axially height-adjustable, the size of the remaining annular gap at the exit from the dosing cyclone can be accordingly varied and, at the same time, also the respective suction pressure in the region of this annular gap can be adapted to the respective requirements. In principle, the lance may carry any nozzles and, in particular, even nozzles including swirl bodies, the use of a lance offering the option to use any nozzles in the region of the discharge opening of the dosing cyclone. The geometry of the flame can be further varied and improved in that the height-adjustable lance is surrounded by a tube immersed into the dosing cyclone and adjustable in height independently of the lance. In this manner, the remaining annular gap can be adjusted independently of the respective lance position that is the most favorable for the flame picture, whereby the combustion can be further improved in that a diffusor into which secondary air nozzles open is arranged between the dosing cyclone and the combustion chamber. At the same time, a backfire of the flame into the cyclone is prevented because of the flow speed being reduced and the pressure within the diffusor being increased. Advantageously, the lance may be sheathed by a refractory material, or cooled.

As already mentioned, the configuration, particularly for hot material charging, can be devised such that at least one downspout including shuttle valves is provided for the charging of dust. Such a simple configuration also enables the optimum proportioning of hot material at an accordingly low pressure in the dosing cyclone and an appropriate weight of the approaching dust column. Basically, fuel can be introduced in solid form, preferably mixed with a carrier gas, in liquid form or in gaseous form. The height-adjustable lance can be guided within a simple gas seal in the wall of the dosing cyclone located opposite the discharge opening. The carrier gas, by which the dust-like cold or hot material is imparted the desired rotation, may be comprised of cold or hot blast air, or oxygen. Basically, also reducing gases may be used as carrier gases, if iron oxide dusts from metallurgical processes are to be reduced subsequently. By an appropriate limitation of the temperature to sintering temperature, or below the melting point, it will be feasible with the device according to the invention to continue to keep the desired finished product in a dust-like state. In particular, when working up materials such as, for instance, cement bypass dusts or marl and lime dusts, it will, thus, be feasible to directly produce dusty clinker or cement so as to avoid the expenses of separate grinding.

In principle, a great number of gas-solids reactions calling for large solids surfaces can be realized using a device of this type. Dusts having extremely low thermal conductivities and, in particular, mineral systems like glass, marl calcinate or the like can be brought to sintering temperatures, or melted as in the case of glass, with low energetic consumption. Particularly in the production of cement slag, an essential advantage consists in that hot material can be supplied at temperatures below melting temperature and accordingly reacted in the consecutively arranged dust burner. Reaction options include the reduction of dusts containing iron oxides and heavy metal oxides, or just the preheating of materials for the production of ceramics. The processing of cement bypass dusts as well as the use of dry sewage sludges and paper slurries as well as dusts derived from waste incineration plants as well as metallurgical dusts as occur in sinter plants, blast furnaces, steel converters or electric furnaces can be realized, just as the simple combustion of shredder light fractions.

By the extremely simply constructed unit, which is characterized by a high flow rate despite its small dimensions, also pyrohydrolyses as well as direct reductions of iron oxides can be carried out in the manner of a plug flow reactor. Pyrohydrolyses of halogen or sulfur compounds will be successful, if $H_2O$ is done in, whereby it is, for, instance, feasible to recover hydrochloric acid from electronic scrap leachates and produce pure iron oxide. A number of mineral substances like iron copper stone can be reacted to recover copper, wherein also the thermal production of energy by a slagging dust burner in a steam power station or a waste incineration plant is to be taken into consideration.

The method according to the invention for oxidizing, reducing, calcining, sintering or melting dusts using a device of the initially defined kind is essentially characterized in that the dosing cyclone is operated at a pressure reduced relative to the pressure in the fuel lance. Such a mode of operation ensures that complex seals for the dosing cyclone can be obviated and that an appropriate suction of material will actually be achieved by the aid of the fuel lance. Particularly with the use of hot material, it is thereby feasible to avoid sluices, which are unsuitable for hot material and relatively expensive. According to the invention, it is, therefore, advantageously proceeded in a manner that the dusts are charged as hot materials.

As with the already known devices, the method is advantageously operated in a manner that secondary air, in a direction inclined relative to the axis of the lance, or other reactive gases are blown into the combustion chamber coaxially with the mouth of the fuel lance and the dosing cyclone, such secondary air impinging as a rotating jacket on the dust-like material to be treated and, hence, being again suited to optimize the flame shape and extend the reaction time accordingly, which can be promoted by injecting the secondary air in counter-swirl to the swirl direction of the dosing cyclone. As a function of the desired purpose of use, the secondary air itself can be oxidizing, reducing or neutral and optionally contain water vapor so as to enable a pyrohydrolysis while separating hydrogen halide.

The dusts charged into the combustion chamber, due to their rotating movement and the optionally externally applied secondary air, can be deflected from colliding with the walls of the combustion chamber such that the refractory expenses in the combustion chamber can be substantially reduced. The adjustment of the respectively optimum flow speeds or turbulences leads to an accordingly high specific heat exchange with an optimization of the respective reaction being also feasible using the appropriate reactive gases. The material formed in each case can be discharged from the burner in solid or molten form, whereby the combustion gas formed in the combustion chamber as well as the carrier gas in the dosing cyclone can advantageously be discharged tangentially in order to safeguard the helical flow desired within the combustion chamber. With the device according to the invention, the dust is finely and uniformly dispersed within the carrier gas in the dosing cyclone.

Shredder light fractions can be admixed to the fuel or used as a fuel, whereby additional combustion oxygen can be fed through the lance and the solids can again be dosed in via the cyclone. If desired, hot gases can be discharged from various zones of the combustion chamber. The slag forming in the event of a melt can be tapped in a suitable manner, wherein it is also possible to provide a metal bath, particularly an iron bath, in the combustion chamber so as to enable further reactions between the slag and metal bath by directly utilizing the combustion heat.

The device according to the invention, like the previously known device, is further characterized in that no injectors are required and, therefore, also coarse-grained material can be processed in addition to extremely fine-grained material.

In the following, the invention will be explained in more detail by way of exemplary embodiments of the device according to the invention schematically illustrated in the drawing, wherein FIG. 1 illustrates a section through a first configuration and FIG. 2 sectionally illustrates an enlarged detail of a modified burner configuration analogous to FIG. 1.

FIG. 1 depicts a dosing cyclone 1 which is charged with raw material via a downspout 2. The raw material can be charged in an accordingly fine-grained form and is, in particular, comprised of cold or hot dusts. The respectively forming material column rests on dosing shuttle valves 3, via which the material is introduced into the dosing cyclone 1 by its own weight. Cold or hot blast air, or also oxygen, is injected through a tangential duct 4, thus imparting on the charging stock the helical acceleration indicated by broken lines 5. In the region of the discharge opening 6 of the dosing cyclone, the acceleration is the highest with the pressure decreasing accordingly. In order to fluidize, and render readily conveyable, also poorly flowable, caking (hot) material in the cyclone, further hot-air or oxygen nozzles as schematically indicated by 17 may tangentially open into the cyclone 1 in addition to the tangential duct 4. The nozzles 17 can be arranged in a manner distributed about the periphery of the cyclone, wherein, for instance, in the event of three nozzles, the latter will each enclose an angle of 120° with one another. Solid, liquid or gaseous fuel is introduced via a lance 7 and ignited in the interior of a combustion chamber 8. The dosing cyclone is nested in the lid 9 of the combustion chamber. The lance 7 can be adjusted in the vertical direction in the sense of double arrow 10. Depending on the position of the lance, a more or less wide annular exit gap is formed in the region of the discharge opening 6 of the dosing cyclone, thus enabling the adjustment of both the shape of the flame and the respectively attainable suction pressure.

In the interior of the combustion chamber, an annular channel 11 is apparent, via which secondary air is ejected while forming a jacket around the mixtures leaving the dosing cyclone in the axial direction. The annular channel 11 can also be arranged outside the combustion chamber 8, i.e. above the lid 9, to surround the dosing cyclone 1 in order to be better protected from the high temperatures prevailing in the combustion chamber. In this case, the annular channel 11 is connected with nozzles opening into the combustion chamber 8. This additional secondary air or reaction gas jacket likewise serves to shape the flame, which is schematically indicated by 12. The direction of emergence of the secondary air jets is indicated by arrows 13, wherein said direction of emergence can also extend in a manner inclined relative to the axis of the lance.

The reacted material can be drawn off in solid or liquid form via the bottom outlet 14 of the combustion chamber 9. The combustion gases formed leave the combustion chamber through the lateral connection 15 and are tangentially drawn off in the sense of arrow 16.

In the main, the optimization of the flame shape results in an improved blending of the gases both with the fuel and with the material to be reacted, whereby, at an appropriate temperature control, also the direct withdrawal of dust-like sintered material through the bottom outlet 14 of the combustion chamber will be feasible.

Figure 2:
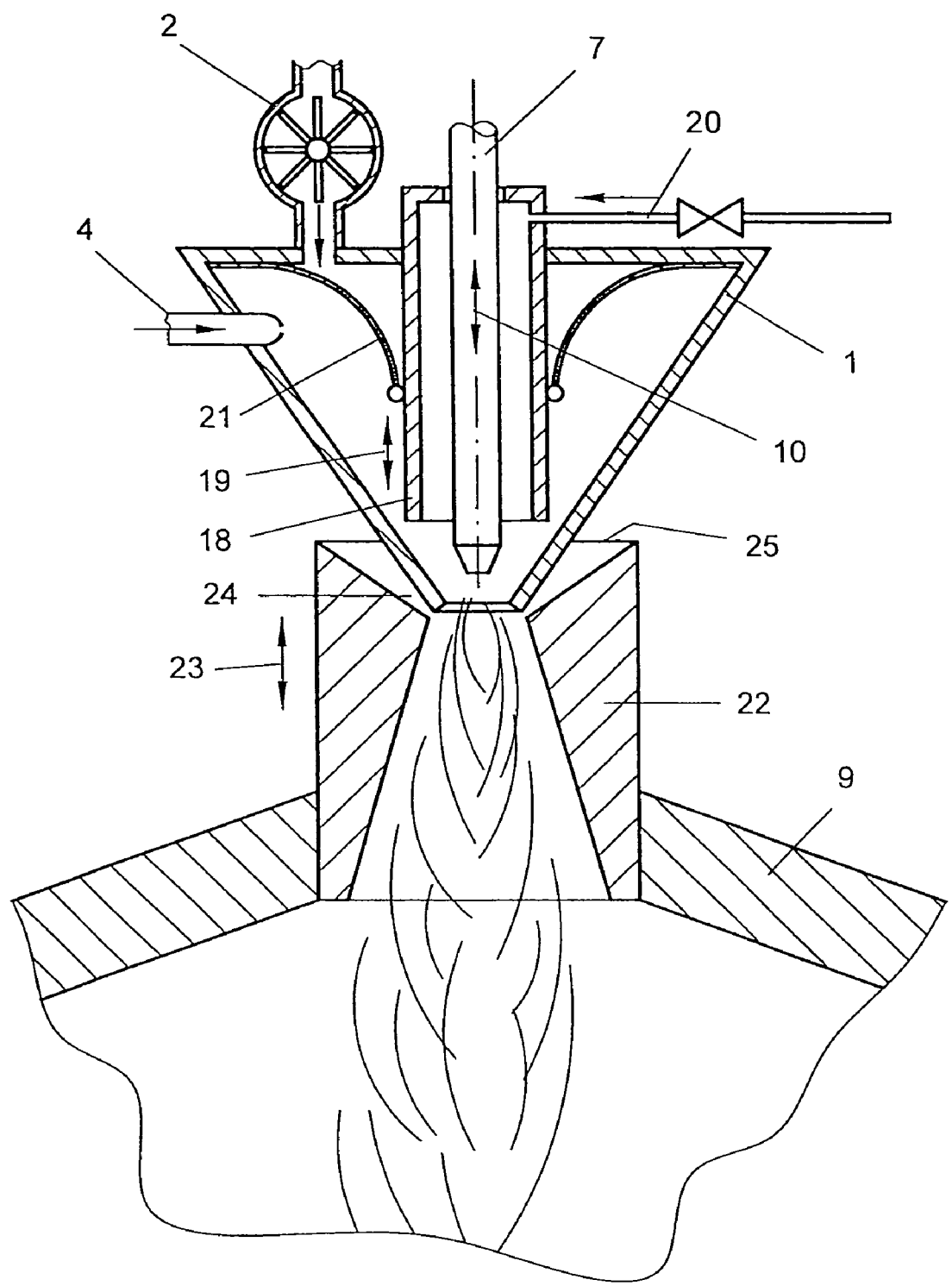

In the embodiment according to FIG. 2, the reference numerals of FIG. 1 have been retained. In the interior of the dosing cyclone 1, a weir tube 18 is now additionally visible, which can be displaced relative to the lance 7 and the wall of the dosing cyclone 1 in the sense of double arrow 19 irrespective of the position of the lance 7. Further additives can be supplied to the weir tube via a duct 20. Guide bodies are schematically illustrated by 21. The cyclone with the lance runs into a diffusor 22, which is, in turn, again arranged in a height-adjustable manner relative to the dosing cyclone 1 in the sense of double arrow 23. Secondary nozzles 24 for the formation of a counter-swirl are arranged in the diffusor brick in a manner accordingly inclined relative to the axis of the diffusor, with a sealing compensator being indicated at 25. The cross sections of the secondary nozzles in this case can be varied by vertical displacements of the diffusor.

In addition to the initially mentioned application, the device according to the invention is, for instance, also suitable for working up tungsten carbide grinding dusts, in which case an $Na_2WO_4$ melt can be formed by the addition of soda as an additive, which melt can be further processed in a simple manner. When using KCl and $SiO_2$ along with water vapor, alkali water glass having the respectively desired alkali content can be produced.

The invention claimed is:

1. A device for oxidizing, reducing, calcining, sintering or melting dusts, comprising
   a dosing cyclone into which the dusts are charged and to which a tangential connector for feeding carrier gases is connected, and
   a combustion chamber following the dosing cyclone in an axial direction, wherein fuel is injected into the combustion chamber coaxially with a discharge opening of the cyclone, wherein
   a lance is arranged in an interior of the dosing cyclone, coaxially with the discharge opening of the dosing cyclone, for the introduction of liquid substances.

2. A device according to claim 1, wherein the lance is height-adjustable in the axial direction.

3. A device according to claim 1, wherein the lance comprises a nozzle in the region of the discharge opening of the dosing cyclone.

4. A device according to claim 1, wherein the lance is sheathed by a refractory material or cooled.

5. A device according to claim 1, wherein a diffusor into which secondary air nozzles open is arranged between the dosing cyclone and the combustion chamber.

6. A device according to claim 1, wherein a height-adjustable lance is surrounded by a tube immersed into the dosing cyclone and adjustable in height independently of the lance.

7. A device according to claim 1, wherein at least one downspout comprising shuttle valves or a cellular wheel sluice is provided for the charging of dust.

8. A method for oxidizing, reducing, calcining, sintering or melting dusts using a device according to claim 1, wherein the dosing cyclone is operated at a pressure reduced relative to the pressure in the lance.

9. A method according to claim 8, wherein the dusts are charged as hot materials.

10. A method according to claim 8, wherein secondary air, in a direction inclined relative to the axis of the lance, is blown into the combustion chamber coaxially with a mouth of the lance and the dosing cyclone.

11. A method according to claim 10, wherein the secondary air is injected in counter-swirl to a swirl direction of the dosing cyclone.

12. A device according to claim 1, wherein the dusts are one or more selected from the group consisting of: furnace dusts, steel dusts, marl and lime dust mixtures, shredder light fractions, mineral dusts, glass dusts, cement kiln bypass dusts, dry sewage sludge, paper slurries, and oil-containing grinding dust suspensions.

13. A device according to claim 1, wherein carrier gas is injected with the fuel into the combustion chamber coaxially with the discharge opening of the cyclone.

14. A device according to claim 1, wherein the liquid substances are one or more selected from the group consisting of: substances dissolved in liquids, substances suspended in gases, gaseous oxidizable substances, and fuels.

15. A device according to claim 2, wherein the lance comprises a nozzle in the region of the discharge opening of the dosing cyclone.

16. A device according to claim 2, wherein the lance is sheathed by a refractory material or cooled.

17. A device according to claim 2, wherein a diffusor into which secondary air nozzles open is arranged between the dosing cyclone and the combustion chamber.

18. A device according to claim 2, wherein the height-adjustable lance is surrounded by a tube immersed into the dosing cyclone and adjustable in height independently of the lance.

19. A device according to claim 2, wherein at least one downspout comprising shuttle valves or a cellular wheel sluice is provided for the charging of dust.

20. A method according to claim 9, wherein secondary air, in a direction inclined relative to the axis of the lance, is blown into the combustion chamber coaxially with a mouth of the lance and the dosing cyclone.

* * * * *